(12) United States Patent
Canard et al.

(10) Patent No.: US 6,341,727 B1
(45) Date of Patent: Jan. 29, 2002

(54) ARRANGEMENT FOR IMMOBILIZING A DATA MEDIUM IN A DATA INTERCHANGE DEVICE

(75) Inventors: Louis Canard, Nevers; Philippe Garcin, Marzy, both of (FR)

(73) Assignee: Valeo Securite Habitacle Renault, Creteil Cedex (FR)

( * ) Notice: Subject to any disclaimer, the term of this patent is extended or adjusted under 35 U.S.C. 154(b) by 0 days.

(21) Appl. No.: 09/444,482

(22) Filed: Nov. 19, 1999

(30) Foreign Application Priority Data

Nov. 19, 1998 (FR) ............................................. 98 14571

(51) Int. Cl.⁷ ................................................. G06K 7/00
(52) U.S. Cl. ........................ 235/486; 235/486; 235/487; 235/457; 235/458; 235/489; 235/483
(58) Field of Search ................................. 235/486, 487, 235/457, 458, 489, 483

(56) References Cited

U.S. PATENT DOCUMENTS

| | | | | |
|---|---|---|---|---|
| 3,564,211 A | * | 2/1971 | Angus ...................... 235/61.11 |
| 3,916,156 A | * | 10/1975 | Pass et al. ............ 235/61.11 A |
| 4,724,310 A | * | 2/1988 | Shimamura et al. ......... 235/483 |
| 4,734,567 A | * | 3/1988 | Hansbauer ................... 235/482 |
| 4,798,945 A | * | 1/1989 | Bruckner et al. ............ 235/479 |
| 4,931,622 A | * | 6/1990 | Ohtsuki et al. .............. 235/487 |
| 5,012,078 A | * | 4/1991 | Pernet ......................... 235/441 |
| 5,120,946 A | * | 6/1992 | Hug et al. ................... 235/441 |
| 5,196,687 A | * | 3/1993 | Sugino et al. .............. 235/483 |
| 5,202,551 A | * | 4/1993 | Parrer et al. ................ 235/486 |
| 5,470,241 A | * | 11/1995 | Kaufman et al. ........... 439/159 |
| 5,905,252 A | * | 5/1999 | Magana ....................... 235/475 |
| 5,912,446 A | * | 6/1999 | Wong et al. ................. 235/449 |
| 6,138,916 A | * | 10/2000 | Zolkos et al. ............... 235/475 |

* cited by examiner

Primary Examiner—Michael G. Lee
Assistant Examiner—Daniel I Walsh
(74) Attorney, Agent, or Firm—Morgan & Finnegan, L.L.P.

(57) ABSTRACT

The invention proposes an arrangement of the type comprising a unit into which a badge is introduced manually into a housing in the unit, and which comprises a lever for immobilizing the badge in an active position in the unit and an electromagnet made to lock the immobilizing lever, wherein this arrangement comprises a member for manually unlocking the immobilizing lever which acts on the mobile core plunger of the electromagnet. It is applicable on board of a motor vehicle in which the anti-theft functions are partially or completely fulfilled by data processing, some of which data represents an authorized user of the vehicle.

14 Claims, 2 Drawing Sheets

ARRANGEMENT FOR IMMOBILIZING A DATA MEDIUM IN A DATA INTERCHANGE DEVICE

BACKGROUND OF THE INVENTION

The present invention relates to an arrangement for the interchange of data between a rigid or semi-rigid data medium and a data interchange device, particularly a reader of data contained in the medium.

BRIEF SUMMARY OF THE INVENTION

The invention relates more particularly to such an arrangement intended to be fitted to a motor vehicle and in which the data medium, which is, for example, in the form of a card or badge of rectangular overall shape, carries data identifying the user of the vehicle which, when he or she introduces his or her badge into the reading device, authorizes him or her to use the vehicle by, in particular, allowing him or her to start the vehicle engine.

Numerous examples of such arrangements in which the data medium is a rigid or semi-rigid card comprising, for example, an integrated circuit, or chip, which is connected to reading means of the device by electrical contacts and/or by a data interchange antenna, are known.

When the badge or the card is introduced into the device, the card is introduced manually into a housing in the unit in which the data medium occupies a determined active position, and the device which receives the card or the badge comprises means for longitudinally holding this data medium in an active position in the unit so that data interchange can occur correctly.

In the most widespread design, these holding means consist of simple brakes, that is to say that there are elastically deformable tabs which cooperate by friction with lateral edges and/or with the large faces of the card.

Such a design of the means for holding the data medium in the reading device is not entirely satisfactory for applications to motor vehicles where, as the vehicle travels along, the device is subjected to a great deal of vibration which gradually causes the data medium to be ejected or at the very least to shift from its active, so-called reading position.

In addition, in the case of applications to motor vehicles, it is necessary to be able not only to hold the data medium in an active position, but also to lock it by immobilizing it in this position, in response to a locking command, so as to prevent the driver or a passenger from being able to extract the data medium from the reading device at an inopportune moment under certain vehicle use configurations.

In order to improve the convenience of use of such an arrangement, it has already been proposed that means be provided to assist with introducing the data medium into the device and/or extracting it therefrom.

To this end, it has already been proposed that the device should comprise a motorized slide into which the card is inserted manually and which is then electrically made to move between its position of rest in which the card is introduced and an active reading position in which the slide brings the card to face reading means.

Such a design is complex and cumbersome and ill-suited to being incorporated into an application for a motor vehicle.

With a view to providing means for assisting with ejection, numerous applications have also been proposed in which the user, on introduction, works against a return spring which stores up energy, the card being immobilized in the active position by operated retaining means, the spring, previously stressed, restoring the energy with a view to assisting with the extraction of the card, it being possible for this assistance to go so far as to completely eject the card from the housing in the unit.

Such a design is not entirely satisfactory either insofar as it requires significant effort at the end of the travel of introducing the card and insofar as the known means of retention against the force applied to the card by the elastic return means are not suited to applications to motor vehicles, as there is the risk that as the vehicle is driven along, the vibration will trigger these means and eject the card at a dangerous and inopportune moment.

In order to overcome the drawbacks just mentioned, there has already been proposed, in French Patent Application No. 98/07250, an arrangement for the interchange of data between a rigid or semi-rigid data medium and a data interchange device, particularly a reader of data contained in the medium, of the type comprising a unit into which the medium, generally in the form of a card, is introduced manually into a housing in the unit in which it occupies a determined active position, and of the type in which the device comprises means for longitudinally holding the data medium in an active position in the unit, which means comprise a lever for immobilizing the support and an electromagnet made to lock the immobilizing lever in its angular position which immobilizes the data medium, the mobile core plunger of which electromagnet constitutes, via a first free end, a locking finger, which can be made to project out of the casing the electromagnet to extend facing a part of the immobilizing lever so as to prevent the latter from rotating from its immobilizing position into a retracted position which allows the data medium to be extracted from the unit.

In the event of electrical failure, particularly when the mobile core plunger of the locking electromagnetic is elastically returned to the position for locking the immobilizing lever, it is impossible for the data medium to be extracted manually.

In order to overcome this drawback, the invention proposes an arrangement of the type mentioned earlier on, characterized in that this arrangement comprises a member for manually unlocking the immobilizing lever which acts on the mobile core plunger of the electromagnetic to cause the locking finger to retract and thus release the immobilizing lever.

According to other features of the invention:
the unlocking member is an unlocking lever, mounted so that it can pivot about a fixed axis of the unit, which comprises a radial actuating arm, the free end of which can be acted upon manually to cause the unlocking lever to rotate from a position of rest in which the mobile plunger is free to move into an unlocked position, and which comprises a radial unlocking arm, the free end of which can cooperate with a part of the mobile core plunger of the electromagnetic to move the latter when the unlocking lever pivots from its position of rest into its unlocked position;
the unlocking lever is elastically returned to its position of rest;
the unlocking lever comprises a turn arm which can flex elastically when the unlocking lever pivots from its position of rest into its unlocked position and the free end of which is immobilized with respect to the unit;
the arrangement comprises a unlocking push-rod which is mounted so that it can slide with respect to the unit in a direction that is orthogonal to the axis of pivoting of unlocking lever, a first end of which cooperates with the free end of the actuating arm and the second end of which makes it possible for the push rod to be acted on manually;

the first end of the unlocking push rod is connected to the free end of the arm that actuates the unlocking lever by a flexible connecting tab which forms an articulation hinge;

the unlocking push rod includes, near its first end, stop means which cooperate with a portion opposite belonging to the actuating arm so as to limit the active travel of the push rod in the direction of unlocking the immobilizing lever;

the lever and the unlocking push rod are formed as a single integral part as a plastic moulding;

the free end of the unlocking arm cooperates with a stop formed at the second free end of the mobile core plunger of the electromagnetic;

the unlocking arm extends in a direction substantially perpendicular to the axis of movement of the mobile core plunger of the electromagnetic, and the actuating arm is substantially parallel to this axis of movement.

the axis of pivoting of the immobilizing lever is parallel to the plane in which the longitudinal direction of introduction of the data medium lies and is parallel to the direction in which the mobile core plunger of the electromagnetic moves and the axis of pivoting of the unlocking lever is perpendicular to the said plane;

the axis of pivoting of the immobilizing lever is perpendicular to the longitudinal direction of introduction of the data medium;

the arrangement is fitted to a motor vehicle in which the anti-theft functions are partially or completely fulfilled by data processing, some of which data, contained in the data medium, represents an authorized user or a group of authorized users of the vehicle.

BRIEF DESCRIPTION OF THE DRAWINGS

Other features and advantages of the invention will emerge from reading the detailed description which follows, for an understanding of which reference will be made to the appended drawings in which.

DETAILED DESCRIPTION OF THE INVENTION

Figure 1:
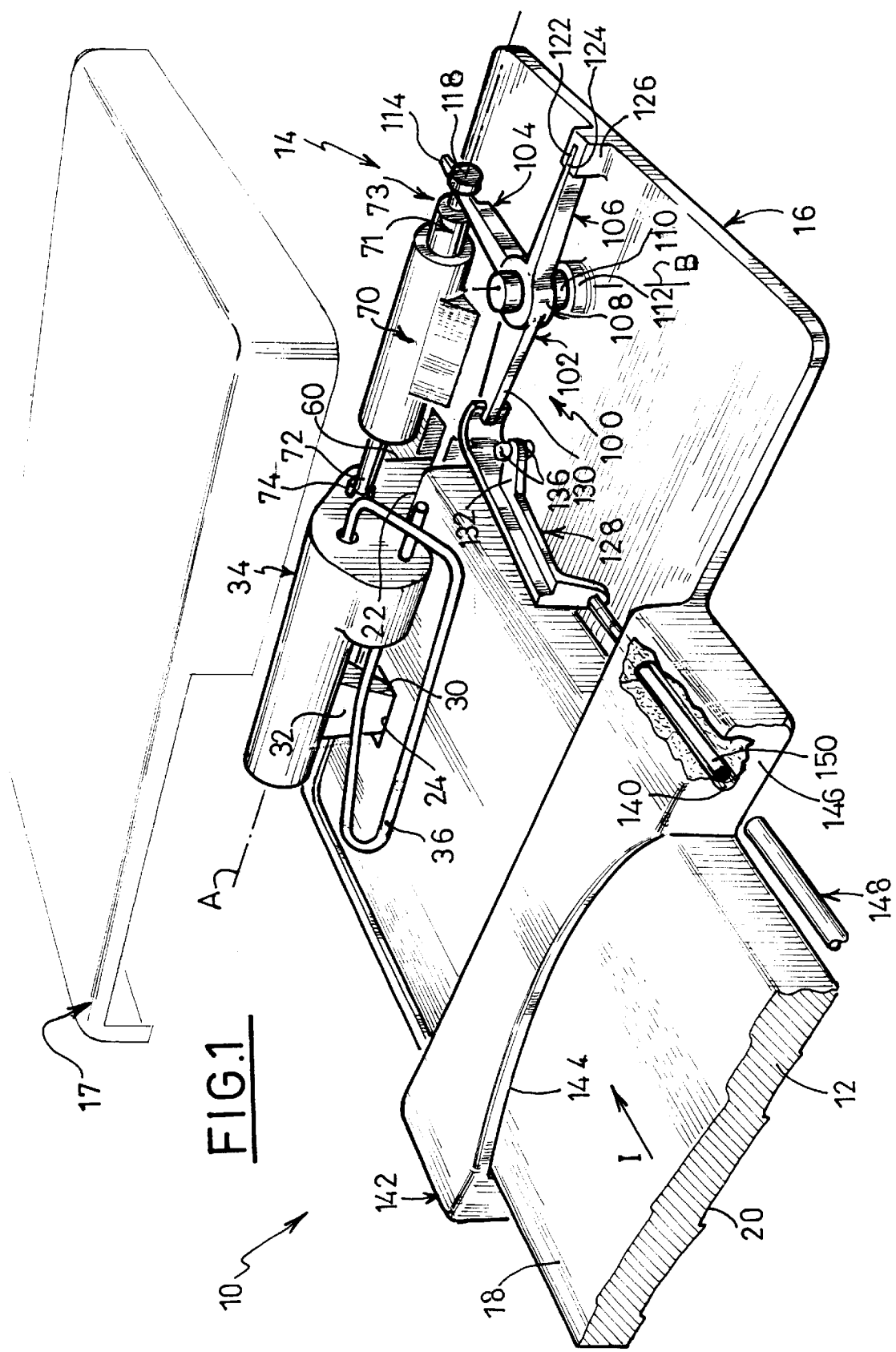
FIG. 1 is a diagrammatic view in perspective on a large scale which illustrates some of the main components of an arrangement in accordance with the teachings of the invention and in which the data medium badge is illustrated in its active longitudinal position in which it is immobilized by the immobilizing finger of the immobilizing lever, the latter being locked by the locking electromagnetic, while the lever for manual unlocking is in its position of rest

In the description which will follows, the terms "vertical", "horizontal", "upper", "lower", "front", "rear", etc. are used with reference to FIG. 1 to make the description and the claims easier to understand, this all being without implied limitation.

The arrangement 10 in accordance with the teachings of the invention and illustrated in the figures essentially consists of a data medium or badge 12 and of a unit 14, of which a lower plate 16 and the silhouette of a cover 17 have been depicted.

The badge 12 in this case is a rigid element of rectangular overall shape and of small thickness which, near its rear longitudinal edge (not depicted) has a part for gripping, allowing it to be handled and in particular slid parallel to its overall plane.

The badge 12 is a data medium which can be introduced longitudinally, that is to say in the direction I parallel to the overall plane of its upper 18 and lower 20 large faces, into the unit 14 and which can be extracted from this unit in the same direction but in the opposite sense.

The means for guiding the sliding of the badge 12 in the unit 14, which are of a known overall design, are not depicted in the figures and will not be described in detail.

As can be seen in the figures, the badge 12 has, at its front part, and near to its front transverse edge 22, a window 24 of rectangular outline and the sides of which are parallel to those of the badge 12.

The window 24 extends vertically into the badge and passes right through it.

The window 24 is an immobilizing window within the meaning of the invention, that is to say it is intended to house an immobilizing member borne by the unit 14 and which will now be described in detail with reference to the figures.

The member for immobilizing the badge 12 in the active position is an immobilizing finger 30 formed at the free end of an immobilizing arm 32 belonging to an immobilizing lever 34 which is mounted so that it can pivot with respect to the unit about a transverse axis A which is perpendicular to the direction I and parallel to the plane which contains this direction I, that is to say parallel to the overall plane of the badge 12 which forms the medium for the data.

The axis A of pivoting of the lever 34 is therefore fixed and the immobilizing lever 34 is mounted so that it can pivot in both direction about this axis between two extreme angular positions. These two positions are two stable positions towards each of which the immobilizing lever 34 is angularly returned elastically by a bistable return spring 36.

In the embodiment illustrated in the figures, the spring 36 is a bent wire spring in the overall shape of a hairpin.

One stable position of the bistable spring 36, not illustrated in the figures, defines the first, retracted, stable position of the immobilizing lever 34, in which its immobilizing finger 30 is retracted, that is to say does not extend facing the plane in which the badge 12 moves, and nor of course does it extend into the immobilizing window 24.

As can be seen in FIG. 1, the immobilizing lever 34 also comprises an operating finger 60 which is formed at the free end of an operating arm belonging to the immobilizing lever 34 so that it can cooperate in the manner of a cam, via its rear face (not shown), with the front traverse edge 22 of the badge 12.

The arrangement also comprises means for locking the immobilizing lever 34 in the stable immobilized position.

In the embodiment illustrated in the figures, the locking means are illustrated diagrammatically in the form of an electromagnet 70, of which the core plunger 71, in the overall form of a rod, has a first free end in the form of a locking finger 72 which is normally partially retracted into the body of the electromagnet 70 and which, in the locked position illustrated in FIG. 1, projects transversely outwards, that is to say in a direction parallel to the axis A of articulation of the immobilizing lever 34, to extend facing a transverse extension 74 of the body of the immobilizing lever 34 in order then to prevent any pivoting of the latter in the direction corresponding to the releasing of the badge with a view to extracting it from the unit.

Figure 2:
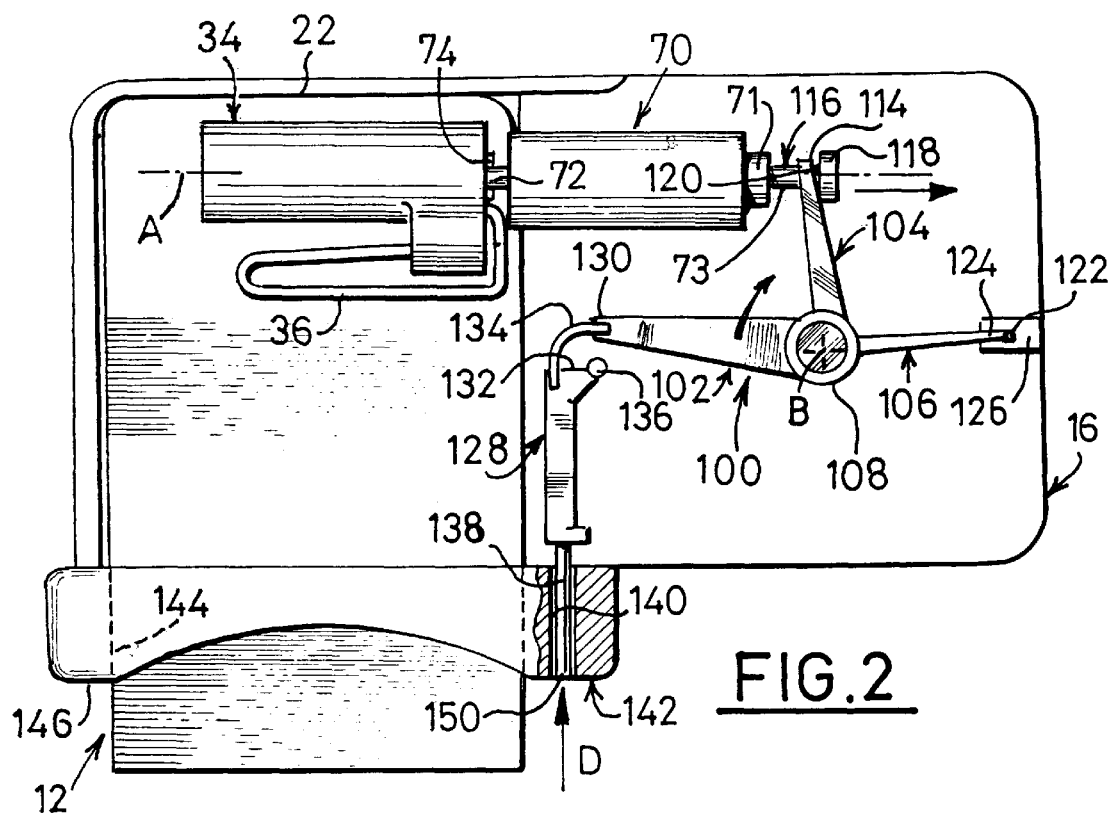
FIG. 2 is plan view from above of the arrangement illustrated in FIG. 1.

In the stable immobilizing angular position illustrated in FIGS. 1 and 2 it is impossible to make the immobilizing lever 34 pivot from its immobilizing position towards its retracted position.

When there is the desire to extract the badge 12 from the data reading and interchange device, the first step must be to retract the locking finger 72. To this end, the electromagnet 70 is operated electrically in the direction which corresponds to a movement of its mobile core plunger, and the rod then moves from left to right when considering FIG. 2.

Then, starting from the position illustrated in FIGS. 1 and 2, the user extracts the badge 12 longitudinally forwards, that is to say downwards when looking at FIG. 2.

The operation of the electromagnet 70 requires, particularly for unlocking the immobilizing arm 34, that its main electric circuit and its control circuit be supplied with electrical power.

In the event of failure, and in order to allow the badge 12 to be extracted manually, means for manually unlocking the immobilizing lever are provided.

In accordance with the teachings of the invention, these means consist of a manual control lever 100 for unlocking the immobilizing lever 34 which acts on the mobile core plunger of the electromagnet 70 to cause the locking finger 72 to retract and thus release the immobilizing lever.

As can be seen in the figures, the unlocking lever 100 is mounted so that it can pivot in both directions about a geometric axis B which is perpendicular to the plate 16 and therefore to the plane of the badge 12, and to the direction of insertion I and to the axis of pivoting of the immobilizing lever 34.

In the arrangement illustrated in the figures, the axis B of the pivoting of the unlocking lever 100 is also orthogonal to the axis along which the rod-shaped mobile core plunger 71 of the electromagnet 70 moves.

The unlocking lever 100 essentially consists of three radial arms: an actuating arm 102, an unlocking arm 104 and an elastic-return arm 106, which are spread out angularly more or less at right angles and which all extend radially from the central body 108 of the unlocking lever 100 which comprises articulation sections 110 housed in complementary parts 112 of the plate 16 and of the cover 17 so that the unlocking lever 100 is mounted so that it can pivot.

The unlocking arm 104 in this instance extends in a direction substantially parallel to the axis of movement of the rod of the electromagnet 70 and its tapered free end 114 is housed in a groove 116 formed in the second free end section 73 of the rod forming the mobile core plunger 71 of the electromagnet 70 which projects axially beyond the body of the electromagnet to the right when considering the figures, that is to say in the opposite direction to the first free end 72 which forms the locking finger.

The groove 116 is bounded axially on the right by a free end cover 118 which delimits a transverse stop surface 120 with which the free end 114 of the unlocking arm 104 can cooperate.

The radial elastic return arm 106 is an arm of reduced cross section which is elastically deformable in terms of flexing with respect to the overall direction of the arm and the free end 122 of which is housed vertically in an open slot 124 belonging to an upper extension 126 of the plate 16.

Thus, the end 122 causes the free end of the bending beam formed by the elastic return arm 106 to be "built in" and also determines the angular position of rest of the unlocking lever 100, which position is illustrated in FIGS. 1 and 2.

To make the unlocking lever 100 rotate about its axis B in the clockwise direction when considering the figures and starting from its position of rest illustrated in FIGS. 1 and 2, there is a push rod 128 for manual unlocking which acts on the free end 130 of the drive arm 102.

For this purpose, the push rod 128 is mounted so that it can slide longitudinally with respect to the unit 14 in a direction D orthogonal to the axis of pivoting B and perpendicular to the axis A of articulation of the immobilizing lever 34 and of movement of the mobile core plunger 71.

The first longitudinal end 132 of the push rod 128 is connected to the free end 130 of the actuating arm 102 by an elbowed thin blade 134 forming a hinge providing connection and articulation between these two elements.

Figure 3:
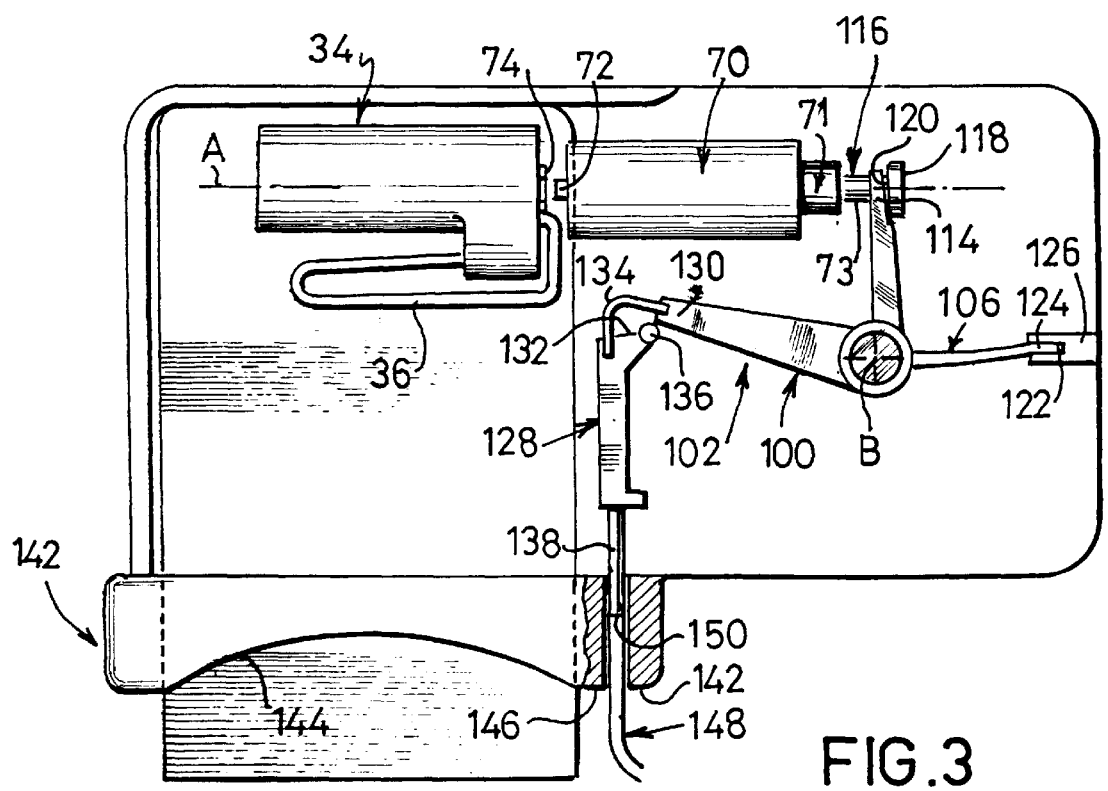
FIG. 3 is a view similar to the view of FIG. 2 illustrating the unlocking lever in the unlocked position following manual action on the push rod.

The first end 132 also comprises a stop finger 136 which, as can be seen in FIG. 3, comes into contact with the part facing it of the free end 130 of the actuating arm 102 to limit the active travel of the push rod 128 in the unlocking direction.

The push rod 128 is guided in its sliding in the direction D by its rod-shaped second longitudinal end 138 which is housed in a corresponding open hole 140 formed in a part 142 of the unit belonging to the plate 16 in which there is also formed a window 144 for introducing the badge 12 and which is delimited by a front transverse face 146.

When the unlocking lever 100 is in the position of rest, the free end 150 of the rod 138 of the push rod 128 is flush with the plane of the transverse face 146.

The operation of the lever 100 for manually unlocking the immobilizing lever 34 will now be described.

When the unlocking lever 100 illustrated in FIGS. 1 and 2 is in the position of rest, the free end 114 of the unlocking arm 104 is housed in the groove 116 of the second end 73 of the mobile core plunger 71 and the latter is free to move axially from left to right when considering FIG. 2, to allow the immobilizing lever 34 to be unlocked, causing the free end forming the locking finger 72 to retract in the same direction.

This unlocking is normally brought about electrically by the electromagnet 70.

In the event of electrical failure, it is possible to act manually on the unlocking lever 100.

For this purpose, as is illustrated in FIG. 3, the user acts on the free end 100 of the rod 138 of the unlocking push rod 128 using an object 148 in the form of a slender rod which is, for example, the end of a paper clip or the tip of ball-point pen.

By acting on the rod 138 in this way, the push rod 128 is made to slide, upwards when considering FIGS. 2 and 3, in the direction D.

The sliding movement of the unlocking push rod 128 is converted into a pivoting movement of the unlocking lever 100, via the hinge 134.

Thus, action on the rod 138 using the tool 148 is converted into a rotational movement, in the clockwise direction when considering FIGS. 2 and 3, of the unlocking lever 100.

This rotational movement causes the end 114 of the unlocking arm 104 to rotate in the same direction and cooperate with the abutment face 120 of the collar 118 of the second end 73 of the mobile core plunger 71, thus causing the mobile core plunger 71 to move in the unlocking direction. This movement, from left to right, has the effect of causing a corresponding movement of the locking finger 72, which is then in its position illustrated in FIG. 3 in which it no longer extends opposite the complementary portion 74 of the immobilizing lever 34, the latter being once more free to pivot about its axis A of articulation, thus allowing the badge 12 to be extracted manually, downwards when considering FIG. 3.

The pivoting of the unlocking lever 100 in the clockwise direction also causes it to return arm 106 to flex and become slightly elastically deformed as can be seen in FIG. 3.

As soon as the user releases his action on the rod 138 of the push rod 128, the elastic energy stored up in the return arm 106 causes the unlocking lever 100 to return automatically to its position of rest illustrated in FIGS. 1 and 2.

By contrast, because of the axial length of the groove 116, the free end 114 of the unlocking arm 104 does not drive the mobile core plunger 71 axially right to left, thus leaving the immobilizing lever 34 free to pivot.

Only electrical power and actuation of the electromagnet 70 can cause the immobilizing lever 34 to become locked again.

The unlocking lever 100 is advantageously produced in a particularly economical way together with the push rod 128 in the form of a single plastic moulding, the hinge 134 thus being produced integrally with the unlocking lever 100 and the push rod 128.

The invention is particularly applicable on board motor vehicles in which the anti-theft functions are partially or completely fulfilled by data processing, some of which data, contained in the medium or badge 12, represent an authorized user or a group of authorized users, of the vehicle.

The data processing is, in particular, aimed at comparing the data contained in the badge 12 with data stored in memory on board the vehicle with a view to allowing authorized use of the vehicle, the processing circuit or circuits providing complete or partial control of anti-theft means, whether these be conventional anti-theft means, that is to say means which act on the vehicle steering column, and/or means for preventing the vehicle engine from being started and/or interrupting the running of the engine.

What is claimed is:

1. An arrangement for the an interchange of data between a data card and a card reader comprising:

an immobilizing lever for immobilizing the data card;

an electromagnet having a movable core plunger, the moveable core plunger having a locking finger disposed on a first end and a stop disposed on a second end thereof, the locking finger being engageable with the immobilizing lever to lock the immobilizing lever in an angular position which immobilizes the data card; and a secondary unlocking member having a free end, the free end being engageable with the stop of the moveable core plunger of the electromagnet to cause the locking finger to retract and thus release the immobilizing lever.

2. An arrangement according to claim 1, wherein the secondary unlocking member is an unlocking lever, mounted so that it can pivot about a fixed axis of pivoting of the card reader, which comprises a radial actuating arm, having a free end which can be acted upon manually to cause the unlocking lever to rotate from a position of rest in which the moveable core plunger is free to move into an unlocked position, and a radial unlocking arm having a free end, the free end being engageable with the moveable core plunger of the electromagnet to move the moveable core plunger when the unlocking lever pivots from its position of rest into its unlocked position.

3. An arrangement according to claim 2, wherein the unlocking lever is elastically biased towards its position of rest.

4. An arrangement according to claim 3, wherein the unlocking lever comprises a return arm which can flex elastically when the unlocking lever pivots from its position of rest into its unlocked position and having a free end which is immobilized with respect to the card reader.

5. An arrangement according to claim 2, comprising an unlocking push rod which is mounted so that it can slide with respect to the card reader in a direction that is orthogonal to an axis of pivoting of the unlocking lever, a first end of which cooperates with a free end of the radial actuating arm and a second end of which makes it possible for the unlocking push rod to be acted on manually.

6. An arrangement according to claim 5, wherein the first end of the unlocking push rod is connected to the free end of the radial actuating arm that actuates the unlocking lever by a flexible connecting tab which forms an articulation hinge.

7. An arrangement according to claim 5, wherein the unlocking push rod includes, near its first end, a stop member which cooperates with the radial actuating arm so as to limit travel of the unlocking push rod in a direction of unlocking the immobilizing lever.

8. An arrangement according to claim 5, wherein the unlocking lever and the unlocking push rod are formed as a single integral plastic molded part.

9. An arrangement according to claim 8, wherein the moveable core plunger defines an axis of movement and the radial unlocking arm extends in a direction substantially perpendicular to the axis of movement of the moveable core plunger, and wherein the radial actuating arm is substantially parallel to the axis of movement.

10. An arrangement according to claim 9, wherein the data card is moveable into the card reader along an introduction plane and wherein the axis of pivoting of the immobilizing lever is parallel to the introduction plane and is parallel to the axis of movement of the moveable core plunger and wherein the axis of pivoting of the unlocking lever is perpendicular to the introduction plane.

11. An arrangement according to claim 2, wherein the axis of pivoting of the unlocking lever is perpendicular to an introduction plane, the data card being moveable into the card reader along the introduction plane.

12. A card reader for slidably receiving a data card, the data card having a leading end portion that includes an aperture, the card reader including an immobilization member having an immobilization finger, the immobilization member being movable so as to move the immobilization finger into and out of the data card aperture, a locking rod engageable with the immobilization member, an electrical drive member for selectively putting the locking rod into or out of engagement with the immobilization member, and a secondary locking member engageable with the locking rod for manually putting the locking member into or out of engagement with the immobilization member.

13. A card reader according to claim 12, wherein the locking rod has a first end portion engageable with the immobilization member and a second end, and wherein the secondary locking member comprises a hub member pivotable relative to the locking rod, a first radial arm engaged with the hub member and the second end of the locking rod, a second radial arm engaged with the hub member and an actuator rod cooperating with the second radial arm such that manipulation of the actuator rod effects moving of the locking rod into or out of engagement with the immobilization member.

14. A card reader according to claim 13 wherein the secondary locking member further includes a third radial arm having one end portion engaged with the hub member and another end portion being fixed, the third radial arm having an elastic characteristic that effects a biasing of the locking rod in a predetermined position.

* * * * *

UNITED STATES PATENT AND TRADEMARK OFFICE
CERTIFICATE OF CORRECTION

PATENT NO.    : 6,341,727 B1
DATED         : January 29, 2002
INVENTOR(S)   : Canard et al.

It is certified that error appears in the above-identified patent and that said Letters Patent is hereby corrected as shown below:

<u>Title page,</u>
Item [73], the Assignee should read: -- Valeo Securite Habitacle, Creteil Cedex; Renault, Boulogne-Billiancourt, both of (FR) --

Signed and Sealed this

Tenth Day of September, 2002

*Attest:*

*Attesting Officer*

JAMES E. ROGAN
*Director of the United States Patent and Trademark Office*